July 27, 1926. 1,594,062
E. C. LA FORGE
AUTOMATIC AIRCRAFT BAGGAGE LOADER
Filed August 11, 1925    2 Sheets-Sheet 1
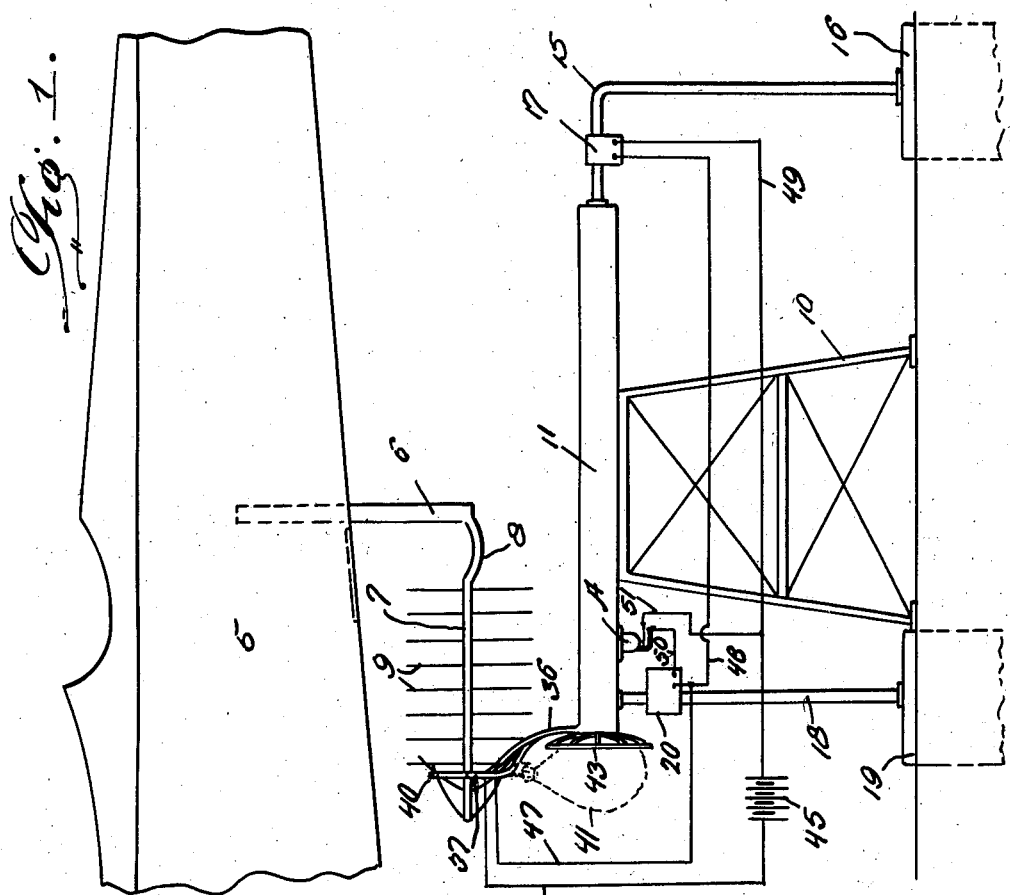
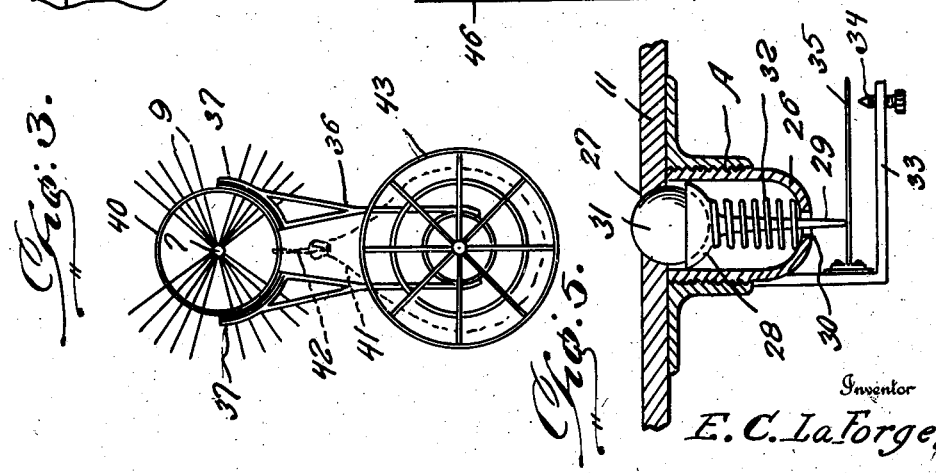
Inventor
E. C. La Forge,
By Clarence A. O'Brian
Attorney

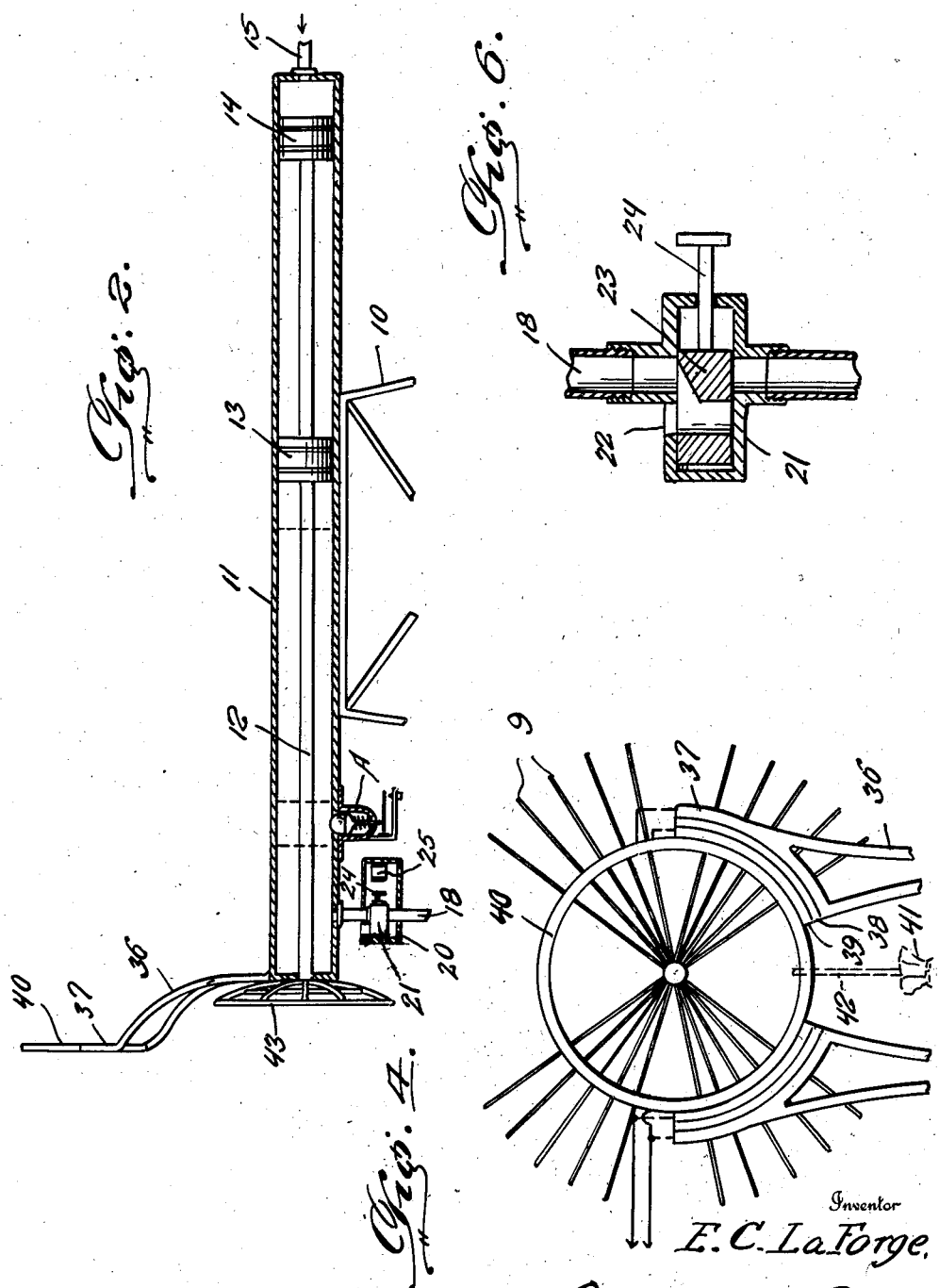

Patented July 27, 1926.

1,594,062

UNITED STATES PATENT OFFICE.

EDWARD C. LA FORGE, OF OAKLAND, CALIFORNIA, ASSIGNOR OF ONE-FOURTH TO CHARLES HUNTINGTON JACOBS, OF SAN FRANCISCO, CALIFORNIA, AND ONE-FOURTH TO ASA F. HARSHBARGER, OF OAKLAND, CALIFORNIA.

AUTOMATIC AIRCRAFT-BAGGAGE LOADER.

Application filed August 11, 1925. Serial No. 49,572.

The present invention relates to a baggage loader designed particularly for use in loading baggage or the like on aeroplanes when in motion.

Owing to the fact that an aeroplane must travel at a comparatively great rate of speed in order to maintain itself in the air, there would be an exceedingly great shock occasioned both to the aeroplane and the baggage should the baggage be picked up merely by the use of such apparatus as is used in connection with mail trains, for instance, and consequently it is the prime object of the present invention to provide an apparatus which will eliminate this shock by moving the baggage at substantially the same speed with the aeroplane.

Another important object of the invention provides an apparatus of this nature which is automatic in its operation, being set in motion when the engaging member of the areoplane comes into contact with a member to which the baggage is attached.

A still further very important object of the invention is to provide an apparatus of this nature which is exceedingly simple in its construction, strong, durable, inexpensive, to manufacture, efficient and reliable in operation, not likely to easily become out of order, and otherwise well adapted to the purpose for which it is designed.

With the above and numerous objects in view as will appear as the description proceeds, the invention resides in certain novel features of construction and in the combination and arrangement of parts as will be hereinafter more fully described and claimed.

In the drawing—

Figure 1 is a fragmentary elevation of an aeroplane fuselage and my apparatus for loading baggage thereto.

Fig. 2 is a longitudinal section through the cylinder of the apparatus,

Fig. 3 is a front end elevation thereof,

Fig. 4 is a view of the upper portion of Fig. 3 on an enlarged scale,

Fig. 5 is a detail enlarged sectional view of a circuit closer used in conjunction with the cylinder, and Fig. 6 is a detail enlarged sectional view showing one of the valves.

Referring to the drawing in detail, it will be seen that 5 designates the fuselage of an aeroplane or any other air vehicle. A hook member 6 is suspended from the fuselage and includes the forwardly extending body portion 7 having a downwardly curved portion 8 adjacent the upright portion which is fixed to the fuselage in any suitable manner. A plurality of spring fingers 9 radiate from the front portion 7 of the hook 6 and are arranged in spaced series. These spring fingers 9 are constructed of electric conducting material such as spring steel wire, spring steel wire coated with copper or the like.

A supporting structure of any suitable formation is indicated by the numeral 10 and has mounted thereon an elongated cylinder 11 having a rod 12 slidable longitudinally thereof and slidable through the forward end thereof. A pair of spaced pistons 13 and 14 are mounted on the rod 12 and slide within the cylinder 11. These pistons may be of any suitable construction having packing elements associated therewith such as the ordinary piston rings. A pipe 15 communicates with the cylinder 11 through the rear end thereof and leads from a source of compressed air 16 and has incorporated therein an electro-magnetic operated valve 17. A pipe 18 communicates with the cylinder 11 adjacent its forward end and leads from a source of compressed air 19. An electro-magnetic operated valve 20 is incorporated in the pipe 18.

The structures of the valves 17 and 20 may be clearly understood from an inspection of Fig. 2 in connection with Fig. 6. Each valve includes a housing in which is disposed a valve casing 21 incorporated in the pipe 15 or 18. This casing 21 has an opening 22. A valve proper 23 is slidable in the casing so as to communicate the opening 22 with the portion of pipe 15 or 18 adjacent the cylinder 11, or to shut off this opening and allow a clear passage through the pipe.

An armature 24 is fixed to the valve proper 23 and is operable by the electro-magnet 25. A circuit closer indicated generally by the letter A is provided in the bottom of the cylinder 11 adjacent the valve 20. This circuit closer includes a casing 26 depending from the cylinder 11 and registering with an opening 27 provided in the cylinder. A seat or cup-like member 28 has a shank 29 depending therefrom through an opening 30 in the casing 26. A ball valve or contact 31 is mounted in the seat 28 and a spring 32 holds the seat 28 normally so that a portion of the ball contact 31 projects above the inner periphery of the cylinder 11. A contact arm 33 is mounted on the casing and supports an adjustable contact 34. A spring contact 35 is normally out of engagement therewith. The piston 13 is adapted to engage the ball contact 31, thereby pushing the seat 28 and its shank 29 downwardly at which time the spring 32 is compressed and the spring contact 35 is forced into engagement with the adjustable contact 34 for closing a circuit as will be set forth later.

Bracket arms 36 rise from the forward end of the cylinder 11 and are curved forwardly to terminate in arcuate seats 37 having strips of insulation 38 thereon for receiving arcuate conductors 39. A ring 40 is adapted to seat in the conductor strips 39 and baggage 41 or the like is fastened thereto in any suitable manner such as being tied thereto by a flexible member 42. A cup-shaped cage-like head 43 is fixed to the forward end of the rod 12 and abuts the forward end of the cylinder 11 when in its initial position as is shown in the drawings.

The electric circuits incident to the apparatus are shown to advantage in Fig. 1, wherein a source of electrical energy is indicated at 45 having a wire 46 leading therefrom and connected with the conductor strips 39. A wire 47 leads from the seats 37 to a wire 48 which is connected to one end of the electro-magnet 25 in the valve 20 and to one end of the electro-magnet 25 in the valve 17. A wire 49 leads from the other end of the electro-magnet valve 17 and returns to the source of electrical energy 45. A wire 50 leads from one contact of the circuit closer A to the other end of the electro-magnet in valve 20 and a wire 51 leads from the other contact of the circuit closer A to the wire 49.

The details of the invention have been described sufficiently to now clearly understand the operation of the invention. As the aeroplane or like air vehicle travels along, it is guided so that the forward portion 7 of the hook 6 will enter the ring 40 and therefore the forward fingers 9 thereon will span the conductor strips 39 and seats 37. This will cause the closing of the circuit so that the current will flow from the source of electrical energy 45, through wire 46, through strips 39, through certain of the fingers 9, through seats 37, through wire 47, wire 48, electro-magnetic operated valve 17 and return through wire 49 to the source of electrical energy 45. The energization of the electro-magnet in valve 17 will cause the opening of this valve so that the air under pressure from the source 16 will flow through the pipe 15 into the rear end of the cylinder 11, thereby pushing the piston 14 forwardly at a great rate of speed, thus causing the rod 12 and cup-shaped cage-like head 43 to travel therewith.

This head engages the baggage as indicated to advantage in Fig. 3 by the dotted line showing and will push the baggage forwardly at somewhat the same rate of speed as the aeroplane is traveling, thereby eliminating any shock to the aeroplane or to the baggage. As the pistons 13 and 14 are moving forwardly, the air in front of piston 13 escapes through the opening 22 of the valve casing 21 in the valve 20. When the piston 13 reaches the circuit closer A it depresses the ball contact 31, thereby closing the circuit closer A as previously indicated, thereby completing the circuit so that the current flows from the source of electrical energy 45, through wire 46, through strips 39, through some of the fingers 9 to the rear of the forward portion 7 of the hook 6, through seats 37, through wire 47, wire 48, electro-magnetic operated valve 20, wire 50, circuit closer A, wires 51 and 49 to the source of electrical energy 45.

The opening of the valve 20 causes the air from the source 19 to flow through pipe 18 in front of the piston 13 to form an air cushion. It is, of course, understood that this entire operation as described takes place in a few seconds as the source of compressed air 16 should be sufficiently strong to literally shoot the piston 14 forwardly through the cylinder 11. The speed at which this must be done will be appreciated by the fact that the aeroplane will probably be traveling at a rate of approximately sixty miles per hour.

It is thought that the construction, operation, utility, and advantages of the invention will now be clearly understood without a more detailed description. The present embodiment of the invention has been disclosed in detail merely by way of example since in actual practice it attains the features of advantages enumerated as desirable in the statement of the invention and the above description.

It will be apparent that numerous changes in the details of construction, and in the combination and arrangement of parts may be made without departing from the spirit or scope of the invention as hereinafter claimed or sacrificing any of its advantages.

Having thus described my invention, what I claim as new is:—

1. An apparatus of the class described including a cylinder, a source of compressed air, a conduit connecting the source of compressed air with the rear end of the cylinder, a piston slidable in the cylinder, a rod connected to the piston and movable through the forward end of the cylinder, a baggage engaging head on the end of the rod, an electro-magnet, a valve in the conduit and operatively connected with the electro-magnet, and means for closing a circuit including the electro-magnet.

2. An apparatus of the class described including a cylinder, a source of compressed air, a conduit connecting the source of compressed air with the rear end of the cylinder, a piston slidable in the cylinder, a rod connected to the piston and movable through the forward end of the cylinder, a baggage engaging head on the end of the rod, an electromagnet, a valve in the conduit and operatively connected with the magnet, means for closing a circuit including the electromagnet, a second source of compressed air, a conduit connecting the second source of compressed air with the forward end of the cylinder, a second electromagnet, a second valve in the second conduit and operatively connected with the second electro-magnet, a circuit closer in the cylinder adjacent the forward end thereof and operable by the piston for closing a circuit including the second electromagnet to open the second valve to deliver compressed air forwardly of the piston to form an air cushion.

3. A baggage loading apparatus for aeroplanes; wherein the aeroplane is provided with a hook for engaging a ring fixed to the baggage; including in combination, means for supporting the ring, means for shooting the baggage forwardly in the line of travel of the aeroplane, and a means operated by the contact of the hook with the ring for operating the shooting means.

4. A baggage loading apparatus for aeroplanes; wherein the aeroplane is provided with a hook for engaging a ring fixed to the baggage; including, in combination, means for supporting the ring, means for shooting the baggage forwardly in the line of travel of the aeroplane, a means operated by the contact of the hook with the ring for operating the shooting means, and means for retarding and dispelling the motion of the shooting means.

5. In combination, an engaging member including a plurality of flexible electricity conducting fingers, a support for an engaged member having spaced contacts to be closed by said fingers, a baggage engaging head, a mechanism for shooting the head forwardly parallel to the path of movement of the engaging member, and an electric circuit including electric means for controlling said mechanism, and said contacts of the support so that when the engaging member contacts with the engaged member on the support, said mechanism is released for shooting the head forwardly.

In testimony whereof I affix my signature.

EDWARD C. LA FORGE.